UNITED STATES PATENT OFFICE.

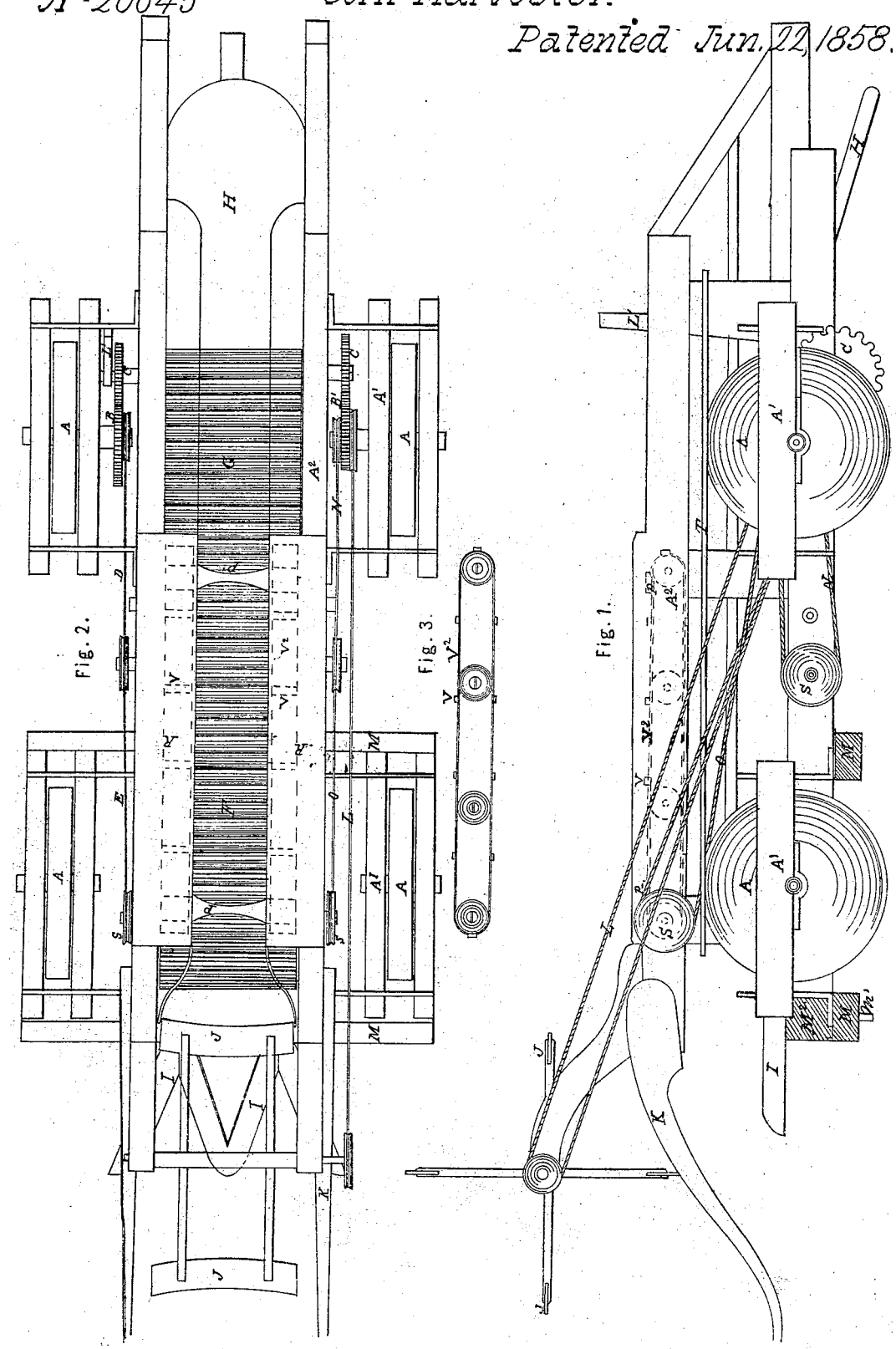

D. LANDON, OF WYANDOT, OHIO.

IMPROVEMENT IN CORN-HARVESTERS.

Specification forming part of Letters Patent No. 20,645, dated June 22, 1858.

*To all whom it may concern:*

Be it known that I, DARIUS LANDON, of Wyandot, in the county of Wyandot and State of Ohio, have invented a new and Improved Mode of Constructing Corn-Harvesters; and I do hereby declare that the following is a full and exact description thereof, reference being had to the accompanying drawings, and to the letters of reference marked thereon.

The nature of my invention consists in constructing a carriage drawn by horse or other power. Attached to the cross-piece M, to which are attached the fore wheels of the carriage, cutters I are made fast to the front sill-piece, $M^2$. As the machine is moved forward, cutting two rows at a time, the corn is forced onto a revolving platform, where it is tied and properly adjusted into a shock and passed through the machine and left standing on the ground.

To enable others skilled in the art to make and use my invention, I will proceed to describe its construction and operation.

Figure 1 is a side view of the machine. Fig. 2 is a plan of the same. Fig. 3 is a section of one of the endless belts which carry the shock-supporters P P'.

A represents the carriage-wheels; A', the pieces to which the axle-bearings are attached; $A^2$, the frame of the carriage; M, the cross-tree on which the forward end of the frame $A^2$ rests, and to which it is attached by the king-bolt $m'$. The platform F receives the corn after it is cut off by the knives I, (received on to the platform in a standing position,) and by the operation of the reel J is kept up until it reaches the shock-supporter P, which rests on the endless belts represented by Fig. 3 and the dotted red lines in Figs. 1 and 2. Those belts, having the same speed as the platform F, serve to keep the corn upright until it reaches P', at which time it has arrived too, and is left standing on platform G, where it is tied by the operator with cord or any other substance known to farmers in tying grain. As soon as the shock is tied and adjusted the operator, who stands on the platform T, by the lever L', throws the wheels B C into gear for the purpose of increasing the speed of platform G to carry the shock quickly off to the slide H, which is attached to the after part of the frame of the carriage $A^2$. This slide H, on being drawn from under the shock of corn, leaves it standing on the ground. As soon as the shock is relieved from the platform G the operator immediately throws the wheels out of gear with the lever L', allowing the platform G to stand still until another shock has arrived from the platform F. Alternately as the shock arrives the shock-supporter P' is removed, P taking its place, P' being set in the place of P to receive and support the corn as it arrives on the platform F.

$V^2$ is the belt to which the cleats V are attached. The supporters P P' rest against those cleats to prevent the pressure of the shock removing them from their place while going through the machine. The belt D carries the platform F. The belt E carries the endless belt on which one end of the shock-supporters rest, and the other endless belt is carried by the belt O, both of the endless belts $V^2$ having the same motion. The platform F is driven by the belt N. The belt L carries the reel J.

K are fingers or gatherers for picking up any stalks that may be fallen down and bringing them in contact with the knives I.

R R are covers to protect the belts and keep the shock-supporters P P' in place.

This machine may be drawn by one horse, and will cut two rows at a time. A boy to drive the horse and one man to bind and guide the shocks to the ground will do the work as fast as a horse can walk.

Having thus fully described my invention, what I claim, and desire to secure by Letters Patent, is—

The platforms F and G, in combination with the endless belts $V^2$, Fig. 3, and shock-supporters P P', Fig. 2, for carrying the shocks of corn through the machine and leaving the same in a standing position on the ground.

DARIUS LANDON.

Attest:
 JOHN S. HOLLINGSHEAD,
 MASON PIGGOTT.